(12) United States Patent
Zhang et al.

(10) Patent No.: US 10,977,112 B2
(45) Date of Patent: Apr. 13, 2021

(54) PERFORMANCE ANOMALY DETECTION

(71) Applicant: International Business Machines Corporation, Armonk, NY (US)

(72) Inventors: Xiao Zhang, Xi'an (CN); Fan Jing Meng, Beijing (CN); Lin Yang, Beijing (CN); Jing Min Xu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 138 days.

(21) Appl. No.: 16/253,262

(22) Filed: Jan. 22, 2019

(65) Prior Publication Data

US 2020/0233735 A1 Jul. 23, 2020

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01); *G06F 11/0751* (2013.01)

(58) Field of Classification Search
CPC . G06F 11/079; G06F 11/0751; G06F 11/0709
See application file for complete search history.

(56) References Cited

U.S. PATENT DOCUMENTS

| | | | |
|---|---|---|---|
| 7,783,745 B1 * | 8/2010 | Bhargava | G06Q 10/06 709/224 |
| 8,868,474 B2 | 10/2014 | Leung et al. | |
| 9,904,584 B2 | 2/2018 | Konig et al. | |
| 2016/0217022 A1 * | 7/2016 | Velipasaoglu | G06F 11/0772 |
| 2017/0063905 A1 | 3/2017 | Muddu et al. | |

FOREIGN PATENT DOCUMENTS

CN 105871634 A 8/2016

OTHER PUBLICATIONS

Bharambe et al., "A Robust Anomaly Detection System," IEEE International Conference on Advances in Engineering & Technology Research, Aug. 2014, IEEE, 7 pages.
Browning, "Entropy-Based Anomaly Detection for SAP z/Os Systems," 2014, 2 pages. https://www.academia.edu/8169035/Entropy_Based_Anomaly_Detection.
Mell et al., "The NIST Definition of Cloud Computing," National Institute of Standards and Technology, Sep. 2011, Special Publication 800-145, U.S Department of Commerce, 7 pages.

* cited by examiner

*Primary Examiner* — Katherine Lin
(74) *Attorney, Agent, or Firm* — Amin, Turocy & Watson, LLP

(57) ABSTRACT

Embodiments facilitating performance anomaly detection are described. A computer-implemented method comprises: detecting, by a device operatively coupled to one or more processing units, based on monitoring data of a plurality of performance metrics of a monitored device, at least one trend within the monitoring data of the respective performance metrics; removing, by the device, the at least one trend from the monitoring data of the respective performance metrics to generate modified data of the respective performance metrics; and detecting, by the device, a performance anomaly based on the modified data of the respective performance metrics and a behavior clustering model comprising at least one steady state.

17 Claims, 8 Drawing Sheets

PERFORMANCE ANOMALY DETECTION

BACKGROUND

Embodiments of the present invention relate to data processing, and more specifically, to performance anomaly detection for a large-scale computing system.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Performance of a large-scale computing system is difficult to manage, investigate, and improve. An example of the large-scale computing system is a large-scale cloud platform offering computational services. There exists a demand for the cloud computing platform to realize stringent performance and availability requirements.

One aspect of improving the performance and availability is based upon monitoring various key performance metrics of the computing system to quantify the performance and availability. However, the computing system can comprise multiple independently developed computing devices, which often operate on diverse hardware configurations and across multiple data centers. Such heterogeneity and complexity of the computing system can cause the monitoring of the key performance metrics and detecting of anomalies in system behavior both difficult and expensive.

According to an aspect of one or more embodiments, there is provided a computer-implemented method facilitating performance anomaly detection. The computer-implemented method comprises: detecting, by a device operatively coupled to one or more processing units, based on monitoring data of a plurality of performance metrics of a monitored device, at least one trend within the monitoring data of the respective performance metrics; removing, by the device, the at least one trend from the monitoring data of the respective performance metrics to generate modified data of the respective performance metrics; and detecting, by the device, a performance anomaly based on the modified data of the respective performance metrics and a behavior clustering model comprising at least one steady state.

According to an aspect of one or more embodiments, there is provided an apparatus facilitating performance anomaly detection. The apparatus comprises: a memory that stores computer executable components; and a processor, operably coupled to the memory, and that executes the computer executable components stored in the memory. The computer executable components comprises at least one computer-executable component that: detects, at least one trend within the monitoring data of the respective performance metrics based on monitoring data of a plurality of performance metrics of a monitored device; removes the at least one trend from the monitoring data of the respective performance metrics to generate modified data of the respective performance metrics; and detects a performance anomaly based on the modified data of the respective performance metrics and a behavior clustering model comprising at least one steady state.

According to an aspect of one or more embodiments, there is provided a computer program product facilitating performance anomaly detection for a large-scale computing system. The computer program product comprises a computer readable storage medium having program instructions embodied therewith, the program instructions executable by a processing unit to cause the processing unit to: detect, by the processing unit, based on monitoring data of a plurality of performance metrics of a monitored device, at least one trend within the monitoring data of the respective performance metrics; remove, by the processing unit, the at least one trend from the monitoring data of the respective performance metrics to generate modified data of the respective performance metrics; and detect, by the processing unit, a performance anomaly based on the modified data of the respective performance metrics and a behavior clustering model comprising at least one steady state.

In addition to the exemplary aspects and embodiments described above, further aspects and embodiments will become apparent by reference to the drawings and by study of the following descriptions.

BRIEF DESCRIPTION OF THE SEVERAL VIEWS OF THE DRAWINGS

Through the more detailed description of some embodiments of one or more embodiments in the accompanying drawings, the above and other objects, features and advantages of one or more embodiments will become more apparent, wherein the same references generally refer to the same components in the embodiments of one or more embodiments.

DETAILED DESCRIPTION

Figure 1:
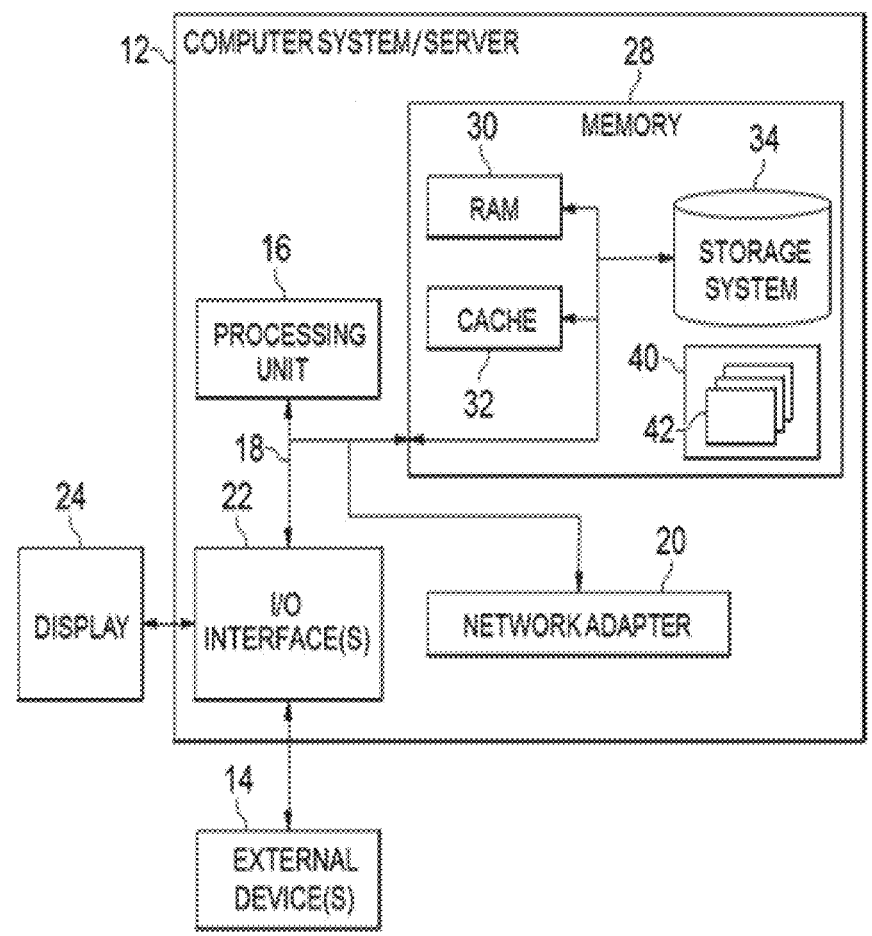
FIG. 1 depicts a cloud computing node according to an embodiment.

Some embodiments will be described in more detail with reference to the accompanying drawings, in which the embodiments of one or more embodiments have been illustrated. However, the one or more embodiments can be implemented in various manners, and thus should not be construed to be limited to the embodiments disclosed herein.

It is understood in advance that although this embodiment includes a detailed description on cloud computing, implementation of the teachings recited herein are not limited to a cloud computing environment. Rather, embodiments of one or more embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
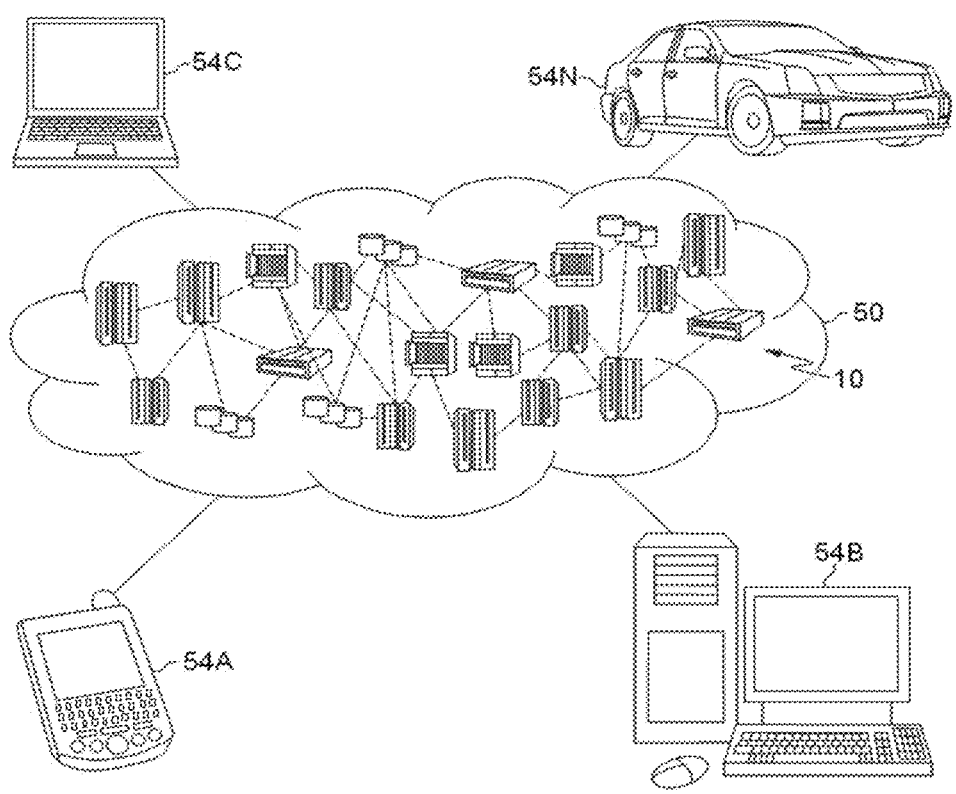
FIG. 2 depicts a cloud computing environment according to an embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
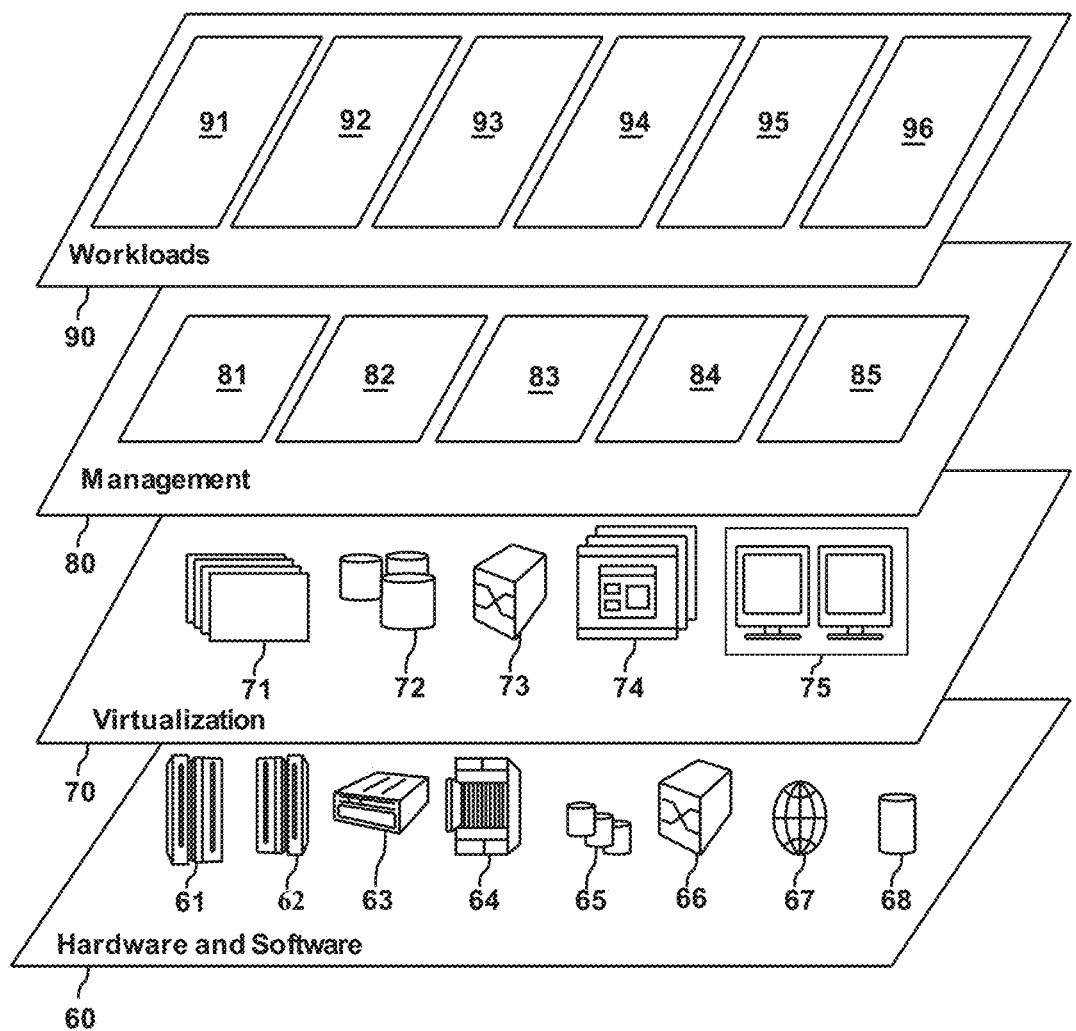
FIG. 3 depicts abstraction model layers according to an embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and performance anomaly detection 96.

The computing system can operate in a plurality of states. For example, the computing system starts in a desired state. The computing system may change its states over time due to daily execution, maintenances, and updates. Some changes evolve the desired states, while some others cause anomalous states, such as deadlocking, memory leak.

The computing system can have a plurality of monitored devices. To avoiding system failure, performance metrics of the monitored devices can be monitored to obtain monitoring data. The monitoring data of the respective performance metrics then can be analyzed to determine the states of the computing system. Since it is hard to use a single metric to determine whether the system is in normal or abnormal state, it is necessary to consider a high dimensional metrics contemporarily. Moreover, the monitoring data of the performance metrics is usually in a form of time series, and could be very complicated. In some cases, the monitoring data can have trend, such as continuous rising or falling, due to performance change or system logic design. Occurrence of such trend is normal and will not affect the performance of the computing device. Moreover, some monitoring data contains too much noise and redundant information.

As above, it is difficult to analyze the monitoring data of the respective performance metrics. Generally, monitoring data analysis heavily depend on the quality of data, pre-defined distribution and human knowledge of selecting suitable performance metrics set(s), therefore, ineffective in performance anomaly detection in large-scale computing systems due to the computation complexity, pre-knowledge requirement, or unbearable overhead.

Embodiments of one or more embodiments provide a method facilitating generating a behavior clustering model. The behavior clustering model can then be used in performance anomaly detection of a computing system. For monitored devices in the computing system, a plurality of performance metrics could be monitored in some time periods to obtain historical monitoring data. In this method, the behavior clustering model can be generated based on the historical monitoring data. Embodiment will be described in detail below in conjunction with the figures.

Figure 4:
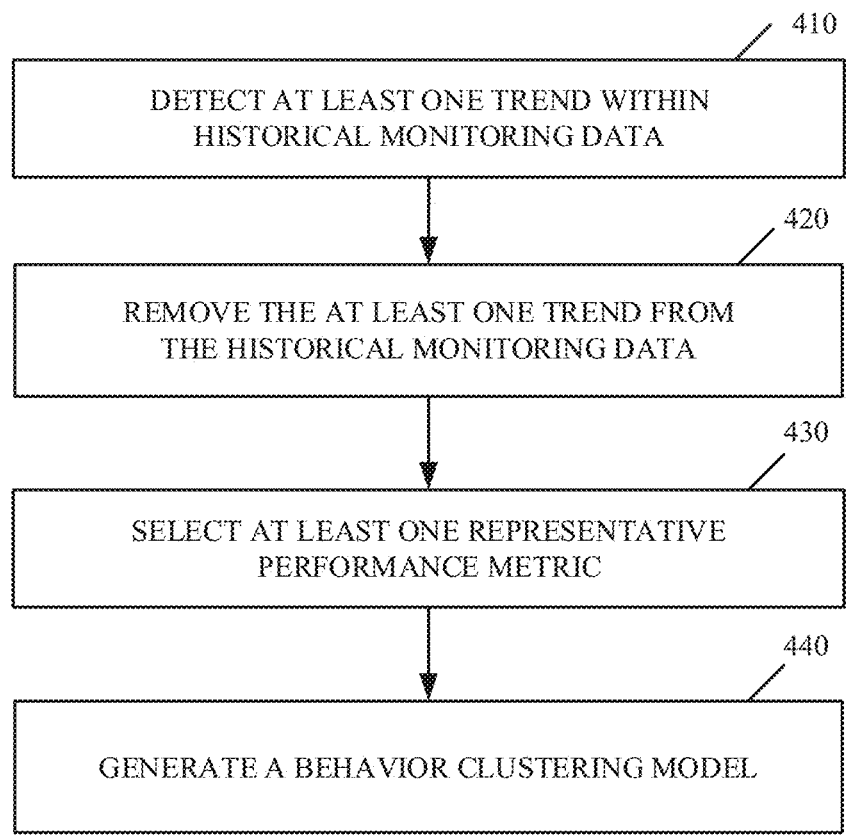
FIG. 4 depicts a schematic flowchart of the computer-implemented method facilitating behavior clustering model generation according to an embodiment.

With reference now to FIG. 4, it shows a schematic flowchart of the method facilitating behavior clustering model generation according to an embodiment. The method can be performed by a computing device, for example, the computer system/server 12 shown in FIG. 1.

As shown in FIG. 4, at block 410, the computing device detects, based on monitoring data of a plurality of performance metrics of a monitored device, at least one trend within the monitoring data of the respective performance metrics. The monitoring data, for example, is historical monitoring data.

In an embodiment, the computing system can have multiple monitored devices, such as the computer system/server 12 shown in FIG. 1. The monitored device can have a plurality of elements, such as CPU, memory, and disk. In an embodiment, the performance of the respective element can be in association with a high dimensional performance metrics, for example, CPU usage information, disk usage information. Thus, the historical monitoring data can be obtained by monitoring the performance metrics of the monitored devices in some time periods.

Generally, the monitoring data are fluctuating data in a form of time series. The monitoring data can have regular trends, such as continuous rising or falling, which can be caused by performance change or system logic design. The computing device can detect the trend within the monitoring data using data mining for similarity measurements, such as aggregation, repeated pattern mining and the like.

Then at block 420, the computing device removes the at least one trend from the historical monitoring data of the respective performance metrics to generate historical modified data of the respective performance metrics.

In an embodiment, the computing device can process the monitoring data with a linear method, such as differential, or a non-linear method, such as least square. As an example, the computing device can differentiate the historical monitoring data. The respective data value within the differentiated monitoring data is the difference between the adjacent data values within the monitoring data. Then, the computing device can remove the data indicating the at least one trend from the differentiated historical monitoring data. Therefore, the computing device can generate the modified data as a smooth time series data.

After generating the historical modified data, at block 430, the computing device selects at least one representative performance metrics from the plurality of performance metrics based on the historical modified data of the respective performance metrics. Since not all of the performance metrics are informative, the computing device can choose the performance metrics with great changes in the monitoring data as the representative performance metrics for further consideration.

In an embodiment, the computing device can calculate an information entropy for each of the performance metrics based on the historical modified data. The performance metric with high information entropy is more significant and informative, while the performance metric with low information entropy is less informative and probably contains noise. Therefore, the computing device can select the performance metrics with information entropies above a threshold as the representative performance metrics. Correspondingly, the computing device can remove the performance metrics with information entropies below a threshold.

Furthermore, it is redundant if more than one representative performance metrics have the same information entropy. Therefore, the computing device can retain one of the representative performance metrics with the same information entropy. Correspondingly, the other representation performance metrics having the same information entropy with the retained one can be removed.

Figure 5:
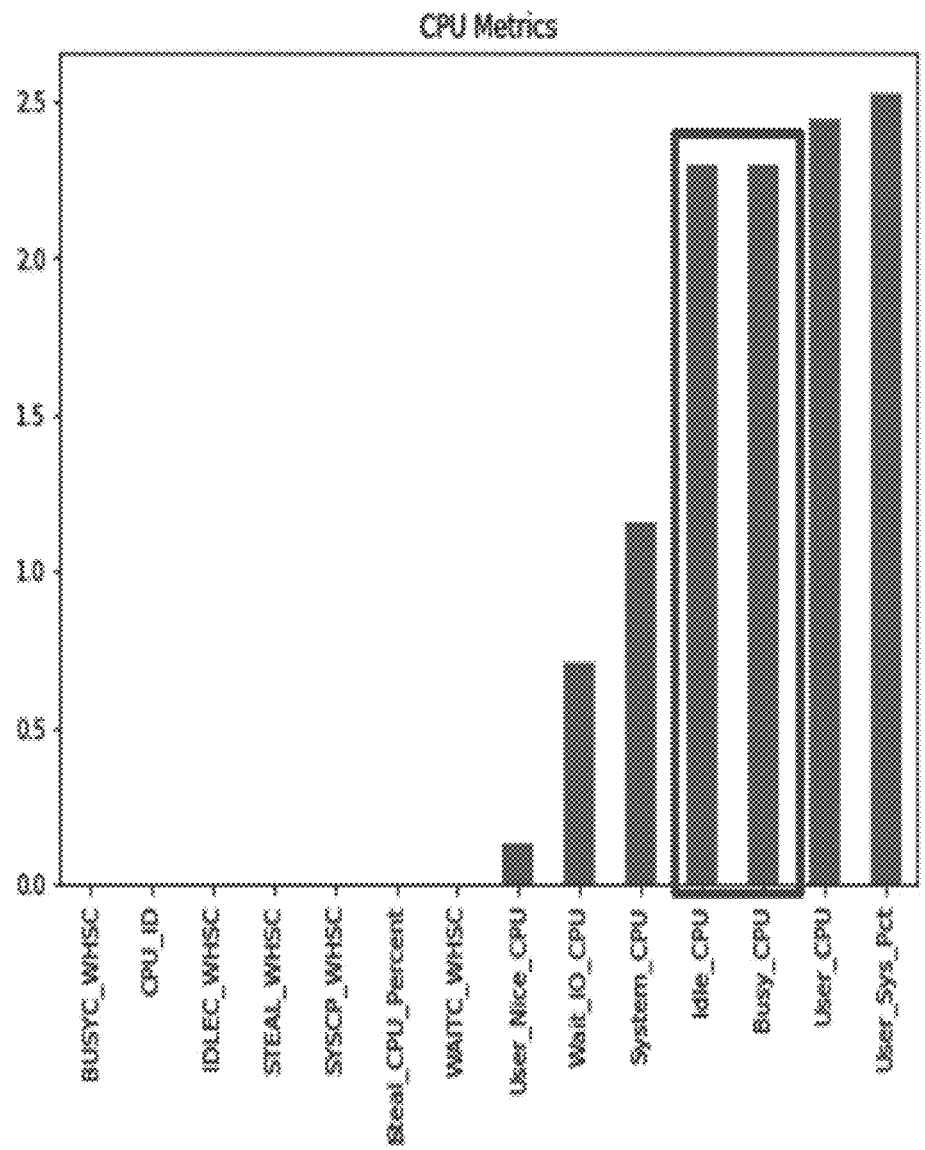
FIG. 5 is a schematic diagram illustrating the performance metrics and their information entropies.

FIG. 5 is a schematic diagram illustrating the performance metrics of CPU and their information entropies. As FIG. 5 shows, there are 12 CPU performance metrics, including BUSYC_WHSC, CPU_ID, IDLEC_WHSC, STEAL_WHSC, SYSCP_WHSC, Steal_CPU_Percent, WAITC_WHSC, User_Nice_CPU, Wait_IO_CPU, System_CPU, Idle_CPU, Busy_CPU, User_CPU, User_Sys_Pct. Each bar of the respective performance metric represents information entropy of the respective performance metric.

As FIG. 5 shows, in response to that the threshold is configured as 0.5, the performance metric with information entropy below 0.5 can be removed. For example, the information entropies for the performance metrics BUSYC_WHSC, CPU_ID, IDLEC_WHSC, STEAL_WHSC, SYSCP_WHSC, Steal_CPU_Percent and WAITC_WHSC are 0. The information entropy for the performance metric User_Nice_CPU is below 0.5. It indicates that the monitoring data of the above performance metrics hardly change. That is, these performance metrics are not informative and can be removed. On the other side, the information entropies for the performance metrics Wait_IO_CPU, System_CPU, Idle_CPU, Busy_CPU, User_CPU and User_Sys_Pct are above 0.5, therefore, these performance metrics can be selected as the representative performance metrics.

Furthermore, as FIG. 5 shows, the information entropies for the performance metrics Idle_CPU and Busy_CPU are the same. Therefore, they have redundant information. Only one of Idle_CPU and Busy_CPU can be retained as one of the representative performance metrics, such that the redundant information can be reduced.

Therefore, after removing less informative items (i.e., the performance metrics with information entropies below the threshold), the dimension of the high-dimensional performance metrics can be reduced from 14 to 5. In this example, the representative performance metrics are Wait_IO_CPU, System_CPU, Idle_CPU (or Busy_CPU), User_CPU and User_Sys_Pct.

As shown in block 440, the computing device generates a behavior clustering model based on the historical modified data of the representative performance metrics.

Figure 6:
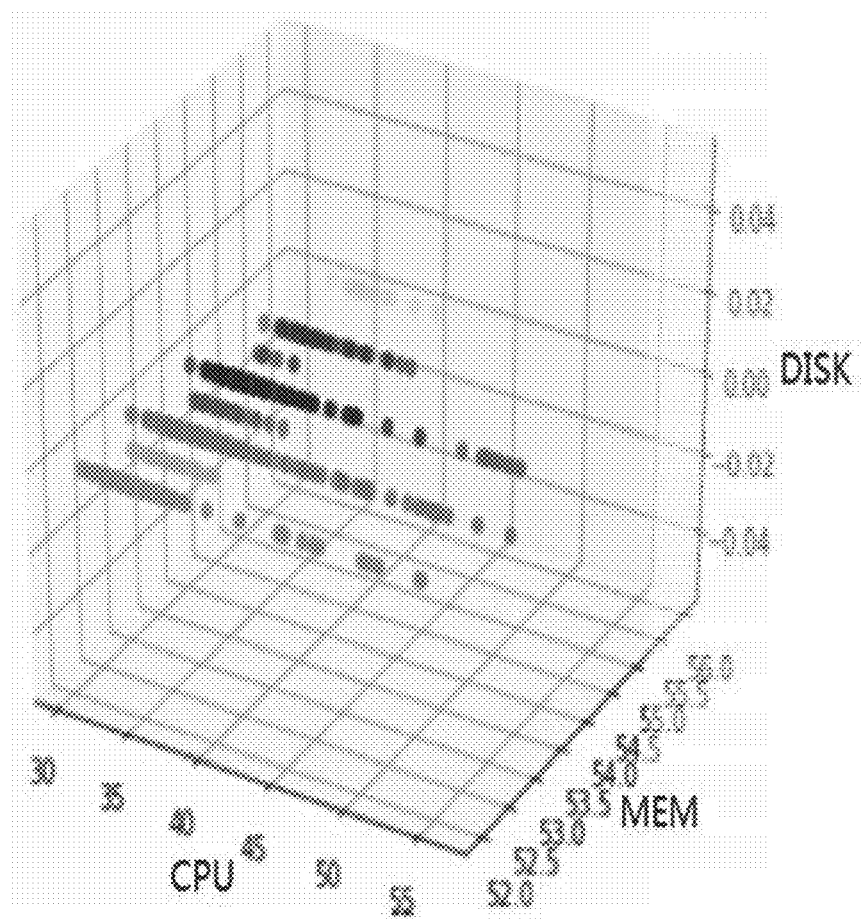
FIG. 6 depicts a schematic diagram of an example of a behavior clustering model.

In an embodiment, the historical modified data of the representative performance metrics can be clustered into several clusters, which form the behavior clustering model. Each cluster indicates a steady state of the computing system. FIG. 6 shows a schematic diagram of an example of a behavior clustering model. As FIG. 6 shows, the steady states in the behavior clustering model is generated based on the historical modified data of the representative performance metrics for CPU, Memory MEM, and Disk.

It can be therefore seen from the above description that, the quality of the clusters can be improved while the number of the clusters can be reduced in the behavior clustering model. Therefore, the robustness of the behavior clustering model can be improved.

Figure 7:
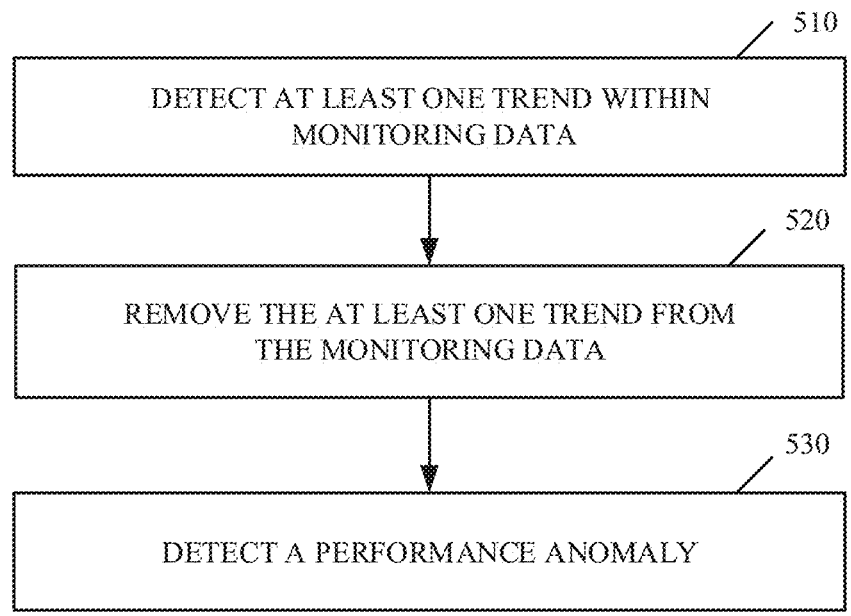
FIG. 7 depicts a schematic flowchart of the method facilitating performance anomaly detection according to an embodiment.

FIG. 7 shows a schematic flowchart of the method facilitating performance anomaly detection according to an embodiment. The method can be performed by the computing device.

As shown in FIG. 7, at block 510, the computing device detects, based on monitoring data of a plurality of performance metrics of a monitored device, at least one trend within the monitoring data of the respective performance metrics. For example, the monitoring data is real-time monitoring data of the performance metrics.

Then, at block 520, the computing device removes the at least one trend from the monitoring data of the respective performance metrics to generate modified data of the respective performance metrics.

In an embodiment, the computing device can differentiate the real-time monitoring data. Then, the computing device can remove the data indicating the at least one trend from the differentiated real-time monitoring data.

After generating the modified monitoring data, at block 530, the computing device detects a performance anomaly based on the modified data of the respective performance metrics and a behavior clustering model. The behavior clustering model can be generated according to the behavior clustering model generation method as FIG. 4 shown.

As described above, there are several steady states in the behavior clustering model. In an embodiment, the computing device can determine the current state based on the modified data of the respective performance metrics and the behavior clustering model comprising multiple steady states. In an embodiment, the computing device can determine whether the modified data of the respective performance metrics are mapped into one of the steady states in the behavior clustering model. In response to the modified data of the respective performance metrics are not mapped into any one of the steady states, the computing device determines that the system is in an anomaly state. Therefore, the performance anomaly of the system is detected. Otherwise, in response to the modified data of the respective performance metrics are mapped into one of the steady states, the computing device determines that the current state is a normal state.

Furthermore, in response to that the performance anomaly is detected, the computing device can transmit a notification. For example, the computing device can display the notification on a display screen or make a sound indicating the notification.

According to embodiments of one or more embodiments, the accuracy and speed of performance anomaly detection is improved by removing the trend within the monitoring data and applying the behavior clustering model as described above.

Figure 8:
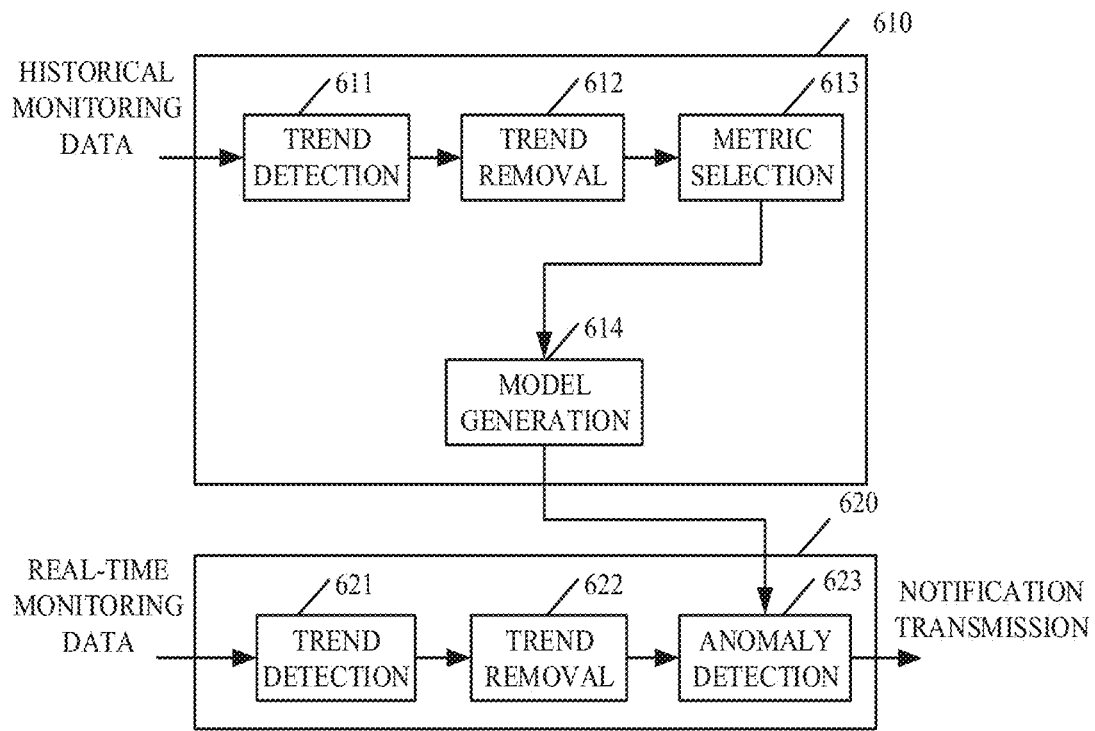
FIG. 8 depicts a schematic diagram for illustrating performance anomaly detection in which the methods shown in FIG. 4 and FIG. 5 are implemented.

FIG. 8 illustrates a schematic diagram for illustrating performance anomaly detection in which the methods shown in FIG. 4 and FIG. 7 are implemented.

As FIG. 8 shows, in block 610, the computing device can train a huge volume of historical monitoring data of the respective performance metrics of the monitored device in a computing system.

First, at block 611, the computing device can detect, based on the historical monitoring data of the plurality of performance metrics for the monitored device in the computing system, at least one trend within the historical monitoring data of respective performance metrics. Then at block 612, the computing device can remove the at least one trend from the historical monitoring data of the respective performance metrics to generate historical modified data of the respective performance metrics. Then at block 613, the computing device can select at least one representative performance metrics from the plurality of performance metrics based on the historical modified data of the respective performance metrics generated from block 612. At block 614, the computing device can generate a behavior clustering model based on the modified data of the representative performance metrics selected from block 613. With a huge volume of historical monitoring data, the generated behavior clustering model is very robust. The clusters, which indicate the steady states, in the behavior clustering model have improved quality and reduced quantity.

In block 620, the computing device can detect the performance anomaly based on the real-time monitoring data of the plurality of performance metrics for the monitored device.

At block 621, the computing device can detect, based on the real-time monitoring data, the trend within the real-time monitoring data of the respective performance metrics. Then at block 622, the computing device can remove the trend from the real-time monitoring data of the respective performance metrics to generate real-time modified data of the respective performance metrics. At block 623, the computing device can determine current state based on the real-time modified data generated from block 622 and the behavior clustering model generated from block 614. If the current state is not mapped into any one of the steady states in the behavior clustering model, the performance anomaly is detected. In response to that the performance anomaly is detected, the computing device can transmit notification.

Under the same inventive concept, another embodiment of the disclosure can provide an apparatus. The apparatus can comprise one or more processors, a memory coupled to at least one of the processors, and a set of computer program instructions stored in the memory and executed by at least one of the processors in order to perform actions of, detecting, based on monitoring data of a plurality of performance metrics of a monitored device, at least one trend within the monitoring data of the respective performance metrics; removing the at least one trend from the monitoring data of the respective performance metrics to generate modified data of the respective performance metrics; and detecting a performance anomaly based on the modified data of the respective performance metrics and a behavior clustering model comprising multiple steady states.

Under the same inventive concept, another embodiment of the disclosure can provide a computer program product. The computer program product can comprise a computer readable storage medium having program instructions embodied therewith, the program instructions executable by a processor to cause the processor to, detect, based on monitoring data of a plurality of performance metrics of a monitored device, at least one trend within the monitoring data of the respective performance metrics; remove the at least one trend from the monitoring data of the respective performance metrics to generate modified data of the respective performance metrics; and detect a performance anomaly based on the modified data of the respective performance metrics and a behavior clustering model comprising multiple steady states.

The present disclosure may be a system, a method, and/or a computer program product. The computer program product may include a computer readable storage medium (or media) having computer readable program instructions thereon for causing a processor to carry out aspects of one or more embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of one or more embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of one or more embodiments.

Aspects of one or more embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of one or more embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of one or more embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   detecting, by a device operatively coupled to one or more processing units, based on monitoring data of a plurality of performance metrics of a monitored device, at least one trend within the monitoring data of the respective performance metrics;
   removing, by the device, the at least one trend from the monitoring data of the respective performance metrics to generate modified data of the respective performance metrics;
   detecting, by the device, a performance anomaly based on the modified data of the respective performance metrics and a behavior clustering model comprising at least one steady state;
   removing, by the device, the at least one trend from the historical monitoring data of the respective performance metrics to generate historical modified data of the respective performance metrics; and
   selecting, by the device, at least one representative performance metric from the plurality of performance metrics based on the historical modified data of the respective performance metrics, wherein the selecting at least one historical representative performance metrics from the plurality of performance metrics based on the historical modified data of the respective performance metrics comprises:
      calculating, by the device, for the respective performance metrics, an information entropy based on the historical modified data; and
      selecting, by the device, the performance metrics with an information entropy above a threshold as the representative performance metrics.

2. The computer-implemented method of claim 1, wherein the removing the at least one trend from the monitoring data of the respective performance metrics comprises:
   differentiating, by the device, the monitoring data; and
   removing, by the device, the data indicating the at least one trend from the differentiated monitoring data.

3. The computer-implemented method of claim 1, wherein the detecting the performance anomaly comprises:
   determining, by the device, whether the modified data of the respective performance metrics is mapped into one of the multiple steady states in the behavior clustering model;
   detecting, by the device, the performance anomaly in response to the modified data of the respective performance metrics being not mapped into any one of the multiple steady states.

4. The computer-implemented method of claim 1, further comprising:
   transmitting, by the device, a notification in response to that the performance anomaly is detected.

5. The computer-implemented method of claim 1, wherein the behavior clustering model is generated by:
   detecting, by the device, based on historical monitoring data of the plurality of performance metrics of the monitored device, at least one trend within the historical monitoring data of the respective performance metrics;
   generating, by the device, the behavior clustering model based on the historical modified data of the representative performance metrics.

6. The computer-implemented method of claim 1, wherein the removing the at least one trend from the historical monitoring data of the respective performance metrics comprises:
   differentiating, by the device, the historical monitoring data; and
   removing, by the device, the data indicating the at least one trend from the differentiated historical monitoring data.

7. The computer-implemented method of claim 1, wherein the selecting at least one historical representative performance metrics from the plurality of performance metrics based on the historical modified data of the respective performance metrics further comprises:
   retaining, by the device, one of the representative performance metrics with the same information entropy.

8. An apparatus comprising:
   a memory that stores computer executable components; and
   a processor, operably coupled to the memory, and that executes the computer executable components stored in the memory, wherein the computer executable components comprise:
      at least one computer-executable component that:
         detects, at least one trend within the monitoring data of the respective performance metrics based on monitoring data of a plurality of performance metrics of a monitored device;
         removes the at least one trend from the monitoring data of the respective performance metrics to generate modified data of the respective performance metrics;
         detects a performance anomaly based on the modified data of the respective performance metrics and a behavior clustering model comprising at least one steady state;

removes the at least one trend from the historical monitoring data of the respective performance metrics to generate historical modified data of the respective performance metrics;

selects at least one representative performance metric from the plurality of performance metrics based on the historical modified data of the respective performance metrics, wherein selection comprises calculation, for the respective performance metrics, an information entropy based on the historical modified data; and selection of the performance metrics with an information entropy above a threshold as the representative performance metrics.

9. The apparatus of claim 8, wherein the at least one computer-executable component further:

differentiates the monitoring data; and removes the data indicating the at least one trend from the differentiated monitoring data.

10. The apparatus of claim 8, wherein the at least one computer-executable component further:

determines whether the modified data of the respective performance metrics is mapped into one of the multiple steady states in the behavior clustering model;

detects the performance anomaly in response to the modified data of the respective performance metrics being not mapped into any one of the multiple steady states.

11. The apparatus of claim 8, wherein the at least one computer-executable component further:

detects, based on historical monitoring data of the plurality of performance metrics of the monitored device, at least one trend within the historical monitoring data of the respective performance metrics;

generates the behavior clustering model based on the historical modified data of the representative performance metrics.

12. The apparatus of claim 11, wherein the at least one computer-executable component further:

differentiates the historical monitoring data; and removes the data indicating the at least one trend from the differentiated historical monitoring data.

13. The apparatus of claim 11, wherein the at least one computer-executable component further:

retains one of the representative performance metrics with the same information entropy.

14. A computer program product facilitating performance anomaly detection for a large-scale computing system, the computer program product comprising a computer readable storage medium having program instructions embodied therewith, the program instructions executable by a processing unit to cause the processing unit to:

detect, by the processing unit, based on monitoring data of a plurality of performance metrics of a monitored device, at least one trend within the monitoring data of the respective performance metrics;

remove, by the processing unit, the at least one trend from the monitoring data of the respective performance metrics to generate modified data of the respective performance metrics;

detect, by the processing unit, a performance anomaly based on the modified data of the respective performance metrics and a behavior clustering model comprising at least one steady state;

remove, by the processing unit, the at least one trend from the historical monitoring data of the respective performance metrics to generate historical modified data of the respective performance metrics; and select, by the processing unit, at least one representative performance metric from the plurality of performance metrics based on the historical modified data of the respective performance metrics, wherein selection comprises calculation, by the processing unit, for the respective performance metrics, an information entropy based on the historical modified data and selection, by the processing unit, the performance metrics with an information entropy above a threshold as the representative performance metrics.

15. The computer program product of claim 14, wherein the program instructions executable by the processing unit cause the processing unit to:

differentiate, by the processing unit, the monitoring data; and remove, by the processing unit, the data indicating the at least one trend from the differentiated monitoring data.

16. The computer program product of claim 14, wherein the program instructions executable by the processing unit cause the processing unit to:

determine, by the processing unit, whether the modified data of the respective performance metrics is mapped into one of the multiple steady states in the behavior clustering model;

detect, by the processing unit, the performance anomaly in response to the modified data of the respective performance metrics being not mapped into any one of the multiple steady states.

17. The computer program product of claim 14, wherein the program instructions executable by the processing unit cause the processing unit to:

detect, by the processing unit, based on historical monitoring data of the plurality of performance metrics of the monitored device, at least one trend within the historical monitoring data of the respective performance metrics; and generate, by the processing unit, the behavior clustering model based on the historical modified data of the representative performance metrics.

* * * * *